United States Patent
Lee

(10) Patent No.: US 11,157,214 B2
(45) Date of Patent: Oct. 26, 2021

(54) CONTROLLER, MEMORY SYSTEM AND OPERATING METHOD THEREOF

(71) Applicant: SK hynix Inc., Gyeonggi-do (KR)

(72) Inventor: Seok Jun Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/790,220

(22) Filed: Feb. 13, 2020

(65) Prior Publication Data
US 2020/0356310 A1 Nov. 12, 2020

(30) Foreign Application Priority Data
May 7, 2019 (KR) .................. 10-2019-0052933

(51) Int. Cl.
*G06F 3/06* (2006.01)
*G06N 3/06* (2006.01)

(52) U.S. Cl.
CPC ............ *G06F 3/0679* (2013.01); *G06F 3/064* (2013.01); *G06F 3/0604* (2013.01);
(Continued)

(58) Field of Classification Search
None
See application file for complete search history.

(56) References Cited

U.S. PATENT DOCUMENTS 4,774,654 A * 9/1988 Pomerene ........... G06F 12/0862
711/118
5,619,663 A * 4/1997 Mizrahi-Shalom ... G06F 9/3802
711/125
(Continued)

FOREIGN PATENT DOCUMENTS

KR 10-0418522 2/2004
WO WO-2016048200 A1 * 3/2016 ..... H04N 21/234327

*Primary Examiner* — Kevin Verbrugge
(74) *Attorney, Agent, or Firm* — IP & T Group LLP

(57) ABSTRACT

In accordance with an embodiment of the present disclosure, an operating method of a controller for controlling a nonvolatile memory device may include: generating pre-read information based on a first read request, reading out $1^{st}$ sub-chunks respectively included in a plurality of data chunks from the nonvolatile memory device, and providing a host with the read $1^{st}$ sub-chunks, wherein the first read request includes respective addresses of the $1^{st}$ sub-chunks; starting, after the $1^{st}$ sub-chunks are provided to the host, a pre-read operation of reading out $2^{nd}$ sub-chunks respectively included in the plurality of data chunks from the nonvolatile memory device based on the pre-read information and storing the read $2^{nd}$ sub-chunks into a memory in the controller; and providing, after the pre-read operation is started, the host with the $2^{nd}$ sub-chunks stored in the memory in response to a second read request received from the host.

16 Claims, 11 Drawing Sheets

(52) U.S. Cl.
CPC .......... *G06F 3/0614* (2013.01); *G06F 3/0658* (2013.01); *G06F 3/0659* (2013.01); *G06N 3/06* (2013.01)

(56) References Cited

U.S. PATENT DOCUMENTS

| | | | | |
|---|---|---|---|---|
| 2006/0069843 A1* | 3/2006 | Emma | ................. | G06F 12/0897 711/3 |
| 2009/0158012 A1* | 6/2009 | Hansen | ............... | G06F 9/30072 712/222 |
| 2013/0151756 A1* | 6/2013 | Tofano | ................. | G06F 3/0679 711/103 |

* cited by examiner

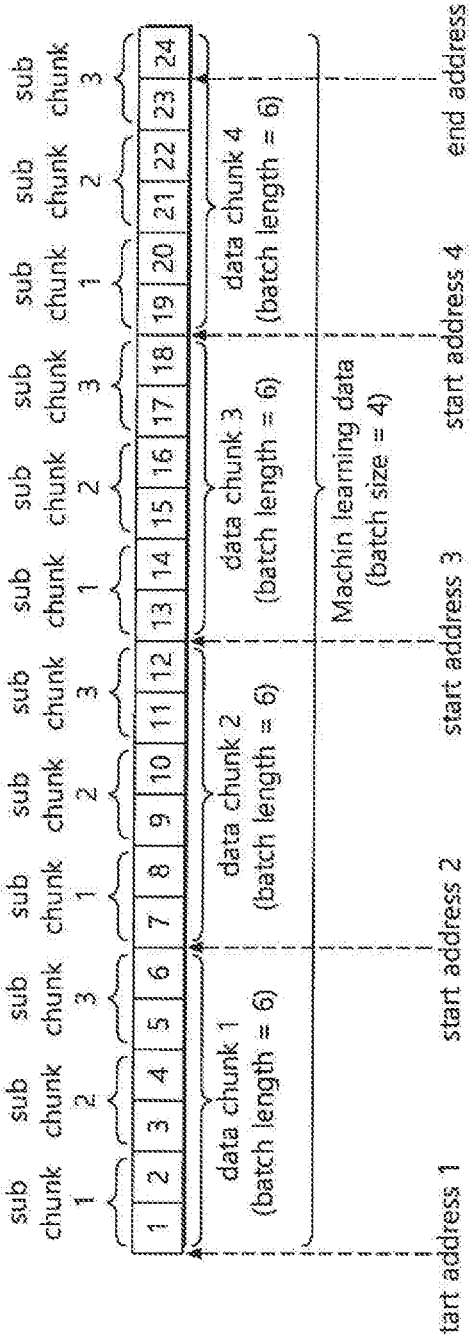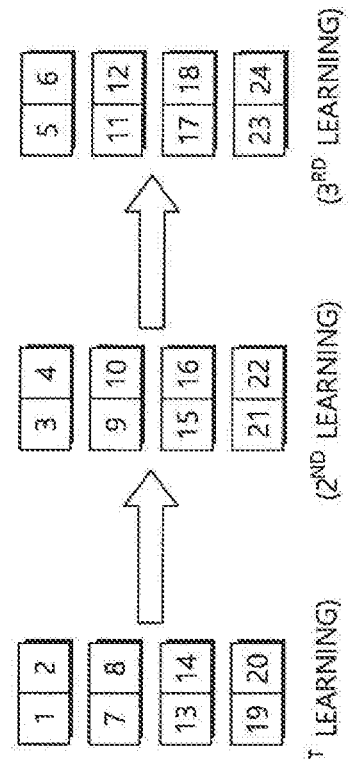
FIG.3(a)
FIG.3(b)

FIG. 4(a)

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

FIG. 4(b)

| 1 | 2 | 7 | 8 | 13 | 14 | 19 | 20 | 3 | 4 | 9 | 10 | 15 | 16 | 21 | 22 | 5 | 6 | 11 | 12 | 17 | 18 | 23 | 24 |

CONTROLLER, MEMORY SYSTEM AND OPERATING METHOD THEREOF

CROSS-REFERENCE TO RELATED APPLICATION

The present application claims priority under 35 U.S.C. § 119(a) to Korean application number 10-2019-0052933, filed on May 7, 2019, in the Korean Intellectual Property Office, which is incorporated herein by reference in its entirety.

BACKGROUND

1. Technical Field

Various embodiments generally relate to a semiconductor device, and more particularly, to a memory system and an operating method thereof.

2. Related Art

Recently, the paradigm for the computing environment has changed to the ubiquitous computing environment in which computer systems can be used anytime, anywhere. Therefore, the use of portable electronic devices such as mobile phones, digital cameras and notebook computers has rapidly increased. Such a portable electronic device generally employs a memory system using a memory device. The memory system is used to store data used in the portable electronic device.

Since the memory system using a memory device has no mechanical driver, the data storage device has excellent stability and durability, exhibits high information access speed, and has low power consumption. Examples of a memory system having such advantages include a universal serial bus (USB) memory device, a memory card having various interfaces, a universal flash storage (UFS) device, and a solid state drive (SSD).

SUMMARY

Various embodiments of the present disclosure provide technology capable of improving the performance of a memory system.

Various embodiments of the present disclosure provide technology capable of effectively reading machine learning data, which is requested by a host, and transmitting the machine learning data to the host.

In accordance with an embodiment of the present disclosure, an operating method of a controller for controlling a nonvolatile memory device may include: generating pre-read information based on a first read request, reading out $1^{st}$ sub-chunks respectively included in a plurality of data chunks from the nonvolatile memory device, and providing a host with the read $1^{st}$ sub-chunks, wherein the first read request includes respective addresses of the $1^{st}$ sub-chunks; starting, after the $1^{st}$ sub-chunks are provided to the host, a pre-read operation of reading out $2^{nd}$ sub-chunks respectively included in the plurality of data chunks from the nonvolatile memory device based on the pre-read information and storing the read $2^{nd}$ sub-chunks into a memory in the controller; and providing, after the pre-read operation is started, the host with the $2^{nd}$ sub-chunks stored in the memory in response to a second read request received from the host, wherein the nonvolatile memory device stores machine learning data that includes the plurality of data chunks, and each of the plurality of data chunks includes a plurality of sub-chunks including the $1^{st}$ and $2^{nd}$ sub-chunks.

In accordance with an embodiment of the present disclosure, a memory system including a nonvolatile memory device configured to store machine learning data; and a controller configured to control the nonvolatile memory device, wherein the machine learning data includes a plurality of data chunks, and each of the plurality of data chunks includes a plurality of sub-chunks, and wherein the controller is further configured to: generate pre-read information based on a first read request, read out $1^{st}$ sub-chunks respectively included in the plurality of data chunks from the nonvolatile memory device, and provide a host with the read $1^{st}$ sub-chunks, wherein the first read request includes respective addresses of the $1^{st}$ sub-chunks; start, after the $1^{st}$ sub-chunks are provided to the host, a pre-read operation of reading out $2^{nd}$ sub-chunks respectively included in the plurality of data chunks from the nonvolatile memory device based on the pre-read information and store the read $2^{nd}$ sub-chunks into a memory in the controller; and provide, after the pre-read operation is started, the host with the $2^{nd}$ sub-chunks stored in the memory in response to a second read request received from the host.

In accordance with an embodiment of the present disclosure, an operating method of a controller for controlling a memory device storing a group of plural data pieces each including plural sub-pieces may include: providing, in response to a request for first sub-pieces within the respective data pieces, a requester with the first sub-pieces while controlling the memory device to read second sub-pieces from the respective data pieces; and providing, in response to a request for Nth sub-pieces within the respective data pieces, the requester with read Nth sub-pieces while controlling the memory device to read out (N+1)th sub-pieces from the respective data pieces, wherein the request is related to the group.

In accordance with an embodiment of the present disclosure, it is possible to improve the performance of a memory system.

In accordance with an embodiment of the present disclosure, it is possible to effectively read machine learning data, which is requested by a host, and transmit the machine learning data to the host.

BRIEF DESCRIPTION OF THE DRAWINGS

Features, aspects and embodiments are described in conjunction with the attached drawings, in which:

FIGS. 3(a), 3(b), 4(a) and 4(b) are schematic diagrams illustrating a pre-read operation in accordance with an embodiment of the present disclosure;

DETAILED DESCRIPTION

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Throughout the specification, reference to "an embodiment" or the like is not necessarily to only one embodiment, and different references to any such phrase are not necessarily to the same embodiment(s).

It will be understood that when an element is referred to as being "connected to", or "coupled to" another element, it may be directly on, connected to, or coupled to the other element, or one or more intervening elements may be present. It will be understood that the terms "comprises," "comprising," "includes," and "including" when used in this specification, specify the presence of the stated elements is and do not preclude the presence or addition of one or more other elements. Similarly, the indefinite articles "a" and "an" mean one or more, unless stated or the context indicates that only one is intended.

Various embodiments of the present disclosure are described below with reference to the accompanying drawings.

Figure 1:
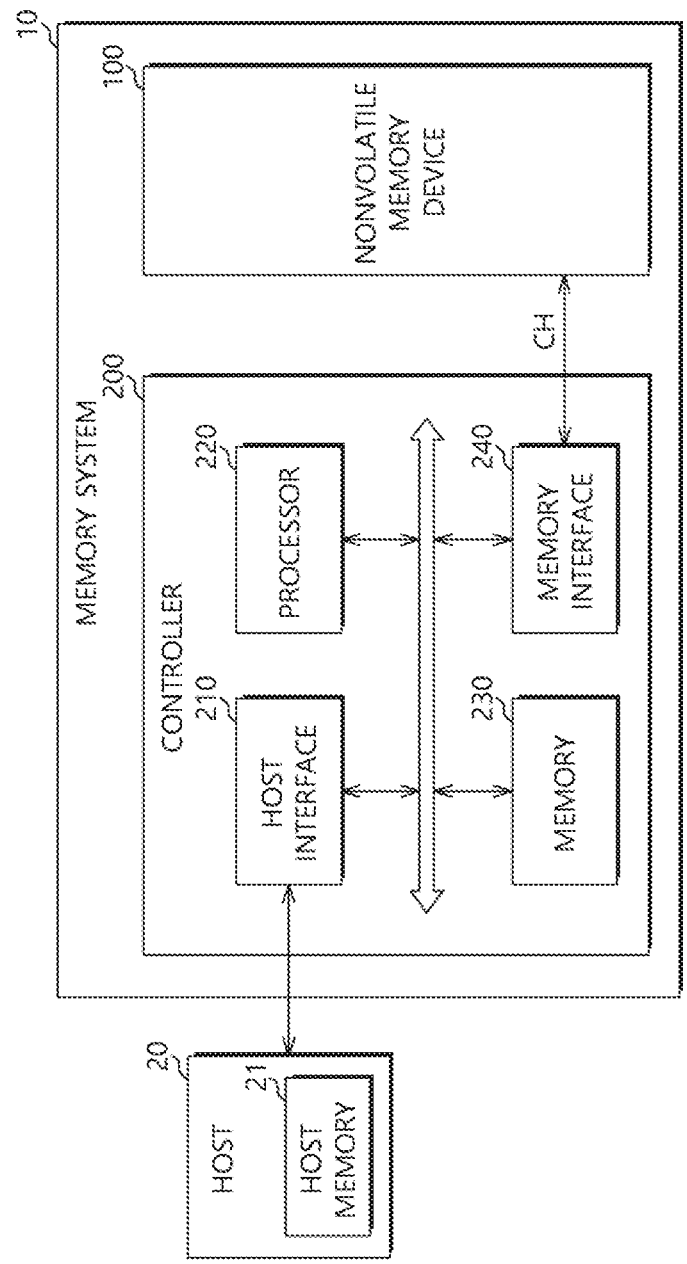
FIG. 1 is a diagram illustrating a configuration of a memory system in accordance with an embodiment of the present disclosure.

FIG. 1 is a diagram illustrating a configuration of a memory system 10 in accordance with an embodiment of the present disclosure.

Referring to FIG. 1, the memory system 10 according to an embodiment may store data to be accessed by any suitable host 20, such as a mobile phone, an MP3 player, a laptop computer, a desktop computer, a game player, a television (TV), and/or an in-vehicle infotainment system.

The memory system 10 may be configured as any of various types of storage devices according to an interface protocol coupled to the host 20. For example, the memory system 10 may be configured as a solid state drive (SSD), a multimedia card in the forms of MMC, eMMC, RS-MMC and micro-MMC, a secure digital card in the forms of SD, mini-SD and micro-SD, a universal serial bus (USB) storage device, a universal flash storage (UFS) device, a storage device of the type of a personal computer memory card international association (PCMCIA) card, a storage device of the type of a peripheral component interconnection (PCI), a storage device of the type of a PCI-express (PCI-E), a compact flash (CF) card, a smart media card, and/or a memory stick.

The memory system 10 may be manufactured as any of various types of packages. For example, the memory system 10 may be manufactured as a package on package (POP), a system in package (SIP), a system on chip (SOC), a multi-chip package (MCP), a chip on board (COB), a wafer-level fabricated package (WFP), and/or a wafer-level stack package (WSP).

The memory system 10 may include a nonvolatile memory device 100 and a controller 200.

The nonvolatile memory device 100 may operate as a storage medium of the memory system 10. The nonvolatile memory device 100 may be implemented as any of various nonvolatile memory device such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase-change random access memory (PRAM) using a chalcogenide alloy, and/or a resistive random access memory (ReRAM) using a transition metal compound.

Although FIG. 1 exemplifies the memory system 10 as including a single nonvolatile memory device 100 for clarity, the memory system 10 may include a plurality of nonvolatile memory devices 100, each of which may operate as described herein.

The nonvolatile memory device 100 may include a memory cell array (not shown) including a plurality of memory cells arranged at intersections between word lines (not shown) and bit lines (not shown). The memory cell array may include a plurality of memory blocks each including a plurality of pages.

For example, each of the memory cells in the memory cell array may be a single level cell (SLC) capable of storing 1-bit data or a multi-level cell (MLC) capable of storing data of 2 or greater bits. Sometimes MLC may be used in the more specific sense to denote a memory cell capable of storing 2-bit data, in which case a memory cell capable of storing 3-bit data may be referred to as a triple level cell (TLC), and a memory cell capable of storing 4-bit data may be referred to as a quadruple level cell (QLC). In the following description, however, the term MLC is used in its more general sense to denote a memory cell capable of storing data of 2 or more bits.

The memory cell array may include SLCs and/or MLCs. The memory cell array may include memory cells arranged in a two-dimensional (e.g., horizontal) structure or memory cells arranged in a three-dimensional (e.g., vertical) structure.

The controller 200 may include a host interface 210, a processor 220 and a memory interface 240. The controller 200 may control general operations of the memory system 10 by driving firmware or software loaded in the memory 230. The controller 200 may decode and drive instructions or algorithms embodied in firmware or software. The controller 200 may be implemented as hardware or combination of hardware and software. Although not illustrated in FIG. 1, the controller 200 may further include an error correction code (ECC) engine configured to generate a parity by ECC-encoding write data provided from the host 20 and to ECC-decode data read from the nonvolatile memory device 100 using the parity.

The host interface 210 may interface the host 20 and the memory system 10 according to a protocol of the host 20. For example, the host interface 210 may communicate with the host 20 through any of a universal serial bus (USB) protocol, a universal flash storage (UFS) protocol, a multimedia card (MMC) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, and/or a PCI express (PCI-E) protocol.

The processor 220 may comprise a micro control unit (MCU) and/or a central processing unit (CPU). The processor 220 may process requests transmitted from the host 20. To process such requests, the processor 220 may drive a code-typed instruction or algorithm (for example, firmware) loaded into the memory 230 and control internal function blocks such as the host interface 210, the memory 230, the memory interface 240 and the nonvolatile memory device 100.

The processor 220 may generate control signals for controlling operations of the nonvolatile memory device 100 based on the requests from the host 20 and may provide the generated control signals to the nonvolatile memory device 100 through the memory interface 240.

The memory 230 may be configured as a read only memory (ROM) and/or a random access memory such as a dynamic random access memory (DRAM) or a static random access memory (SRAM). The memory 230 may store the firmware to be driven by the processor 220. The memory 230 may also store data (for example, meta data) for driving of the firmware. That is, the memory 230 may operate as a working memory of the processor 220.

The memory 230 may include a data buffer configured to temporarily store write data received from the host 20 and to be transmitted to the nonvolatile memory device 100 or to store data read from the nonvolatile memory device 100 and to be transmitted to the host 20. That is, the memory 230 may operate as a buffer memory of the processor 220.

As those skilled in the art will understand, the memory 230 may include regions used for various purposes such as a region serving as a write data buffer configured to temporarily store write data, a region serving as a read data buffer configured to temporarily store read data, and a region serving as a map cache buffer configured to cache map data.

Also, the memory 230 may store system data or meta data.

When the nonvolatile memory device 100 is implemented as a flash memory device, the processor 220 may drive software referred to as a flash translation layer (FTL) in order to control an intrinsic operation of the nonvolatile memory device 100 and provide device compatibility to the host 20. As the FTL is driven, the host 20 may regard and use the memory system 10 as a general storage device such as a hard disk.

The memory interface 240 may control the nonvolatile memory device 100 according to the control of the processor 220. The memory interface 240 may be referred to as a memory controller. The memory interface 240 may provide control signals to the nonvolatile memory device 100. The control signals may include a command, an address, and an operation control signal, and the like for controlling the nonvolatile memory device 100. The memory interface 240 may provide the nonvolatile memory device 100 with data stored in the data buffer or store data transmitted from the nonvolatile memory device 100 in the data buffer.

The controller 200 may further include a first memory (not illustrated) directly coupled to the processor 220. The processor 220 may load firmware from the memory 230 to the first memory and then may drive the firmware. In an embodiment, the first memory may be provided external to the controller 200.

Figure 2:
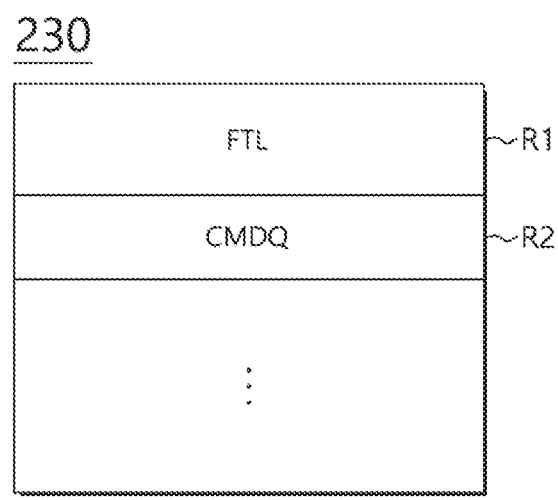
FIG. 2 is a diagram illustrating a configuration of a memory, such as that illustrated in FIG. 1.

FIG. 2 is a diagram illustrating a configuration of the memory 230 illustrated in FIG. 1.

Referring to FIG. 2, the memory 230 in accordance with an embodiment of the present disclosure may include a first region R1, in which the flash translation layer (FTL) is stored, a second region R2 used as a command queue CMDQ configured to queue commands corresponding to requests provided from the host 20. However, as those skilled in the art will understand, the memory 230 may include one or more other regions, such as the regions serving as various buffers described above.

When the nonvolatile memory device 100 is implemented as a flash memory device, the processor 220 may drive software referred to as the flash translation layer (FTL) in order to control an intrinsic operation of the nonvolatile memory device 100 and to provide the host 20 with device compatibility. Through the driving of the flash translation layer (FTL), the host 20 may recognize and use the memory system 10 as a general storage device such as a hard disk.

The flash translation layer (FTL) stored in the first region R1 of the memory 230 may include modules configured to perform various operations and metadata to drive the respective modules. The flash translation layer (FTL) may be stored in a system region (not illustrated) of the nonvolatile memory device 100. When the memory system 10 is powered on, the flash translation layer (FTL) may be read from the system region of the nonvolatile memory device 100 and loaded to the first region R1 of the memory 230.

FIGS. 3(a), 3(b), 4(a) and 4(b) are schematic diagrams illustrating a pre-read operation in accordance with an embodiment of the present disclosure.

FIG. 3(a) illustrates an example of machine learning data that the host 20 requests from the memory system 10 in order to perform a machine learning operation based on the Recurrent Neural Networks (RNN) scheme and/or the Long Short-Term Memory models (LTSM) scheme. It is assumed that the machine learning data illustrated in FIG. 3(a) is stored in the memory system 10 through a sequential write operation such that the machine learning data has consecutive is addresses indicating regions from a data storage region 1 to a data storage region 24.

The machine learning data may include a plurality of data chunks (for example, data chunk 1 to data chunk 4), each of which may include a plurality of sub-chunks (for example, sub-chunk 1 to sub-chunk 3).

A discrete number of data chunks may correspond to a batch size, which data chunks are batch-processed during a machine learning operation. A single data chunk may constitute a batch unit that is batch-processed during a machine learning operation. The size of a single data chunk may correspond to a batch length indicating a discrete amount of data that is batch-processed during a machine learning operation. A single sub-chunk may be a discrete unit processed by a single unit learning operation. A plurality of unit learning operations may configure a single machine learning operation.

FIG. 3(b) exemplifies a plurality of unit learning operations for a machine learning operation based on the RNN scheme and/or the LSTM scheme. Among the plurality of unit learning operations configuring a machine learning operation, a result of a current unit learning operation may affect a subsequent unit learning operation. Therefore, the host 20 may perform a $1^{st}$ unit learning operation based on $1^{st}$ sub-chunks (sub chunk 1) from the respective data chunks, may perform a $2^{nd}$ unit learning operation based on $2^{nd}$ sub-chunks (sub chunk 2) from the respective data chunks when the $1^{st}$ unit learning operation is completed, and may perform a $3^{rd}$ unit learning operation based on $3^{rd}$ sub-chunks (sub chunk 3) from the respective data chunks when the $2^{nd}$ unit learning operation is completed.

FIG. 4(a) exemplifies a sequential read operation of sequentially reading machine learning data stored in the nonvolatile memory device 100. FIG. 4(*b*) exemplifies a random read operation of reading machine learning data sequentially stored in the nonvolatile memory device 100 according to an order of unit learning operations.

As illustrated in FIG. 4(*a*), when machine learning data is sequentially written into the nonvolatile memory device 100 to correspond to consecutive addresses and then sequentially transmitted to the host 20, the host memory 21 should store therein all of the provided machine learning data. Considering that machine learning data is enormous in general, the host memory 21 should have a storage capacity large enough to accommodate all of the machine learning data, which is not preferable in terms of efficiency and cost. Therefore, according to a machine learning scheme such as the RNN scheme, the host 20 may effectively perform a machine learning operation by requesting the memory system 10 to read machine learning data suitable for a plurality of unit learning operations configuring a machine learning operation, as illustrated in FIG. 4(*b*).

In this case, the host 20 may provide the memory system 10 with a read request for $1^{st}$ sub-chunks required for a $1^{st}$ unit learning operation, the $1^{st}$ sub-chunks being selected from the respective data chunks. When completing the $1^{st}$ unit learning operation based on the $1^{st}$ sub-chunks received from the memory system 10, the host 20 may provide the memory system 10 with a read request for $2^{nd}$ sub-chunks required for a $2^{nd}$ unit learning operation, the $2^{nd}$ sub-chunks also being selected from the respective data chunks. That is, according to a machine learning scheme such as the RNN scheme, the memory system 10 may predict a subsequent read request for subsequent sub-chunks based on completion of a previous read request for sub-chunks from the host 20.

In accordance with an embodiment of the present invention, memory system technology is provided that enables a host to effectively perform a machine learning operation through a pre-read operation of reading in advance, when receiving a read request for $N^{th}$ sub-chunks from a host, $(N+1)^{th}$ sub-chunks subsequent to the $N^{th}$ sub-chunks before receiving a read request for the $(N+1)^{th}$ sub-chunks from the host. The $(N+1)^{th}$ sub-chunks may be subsequent to the $N^{th}$ sub-chunks within the data chunks, respectively.

Figure 5:
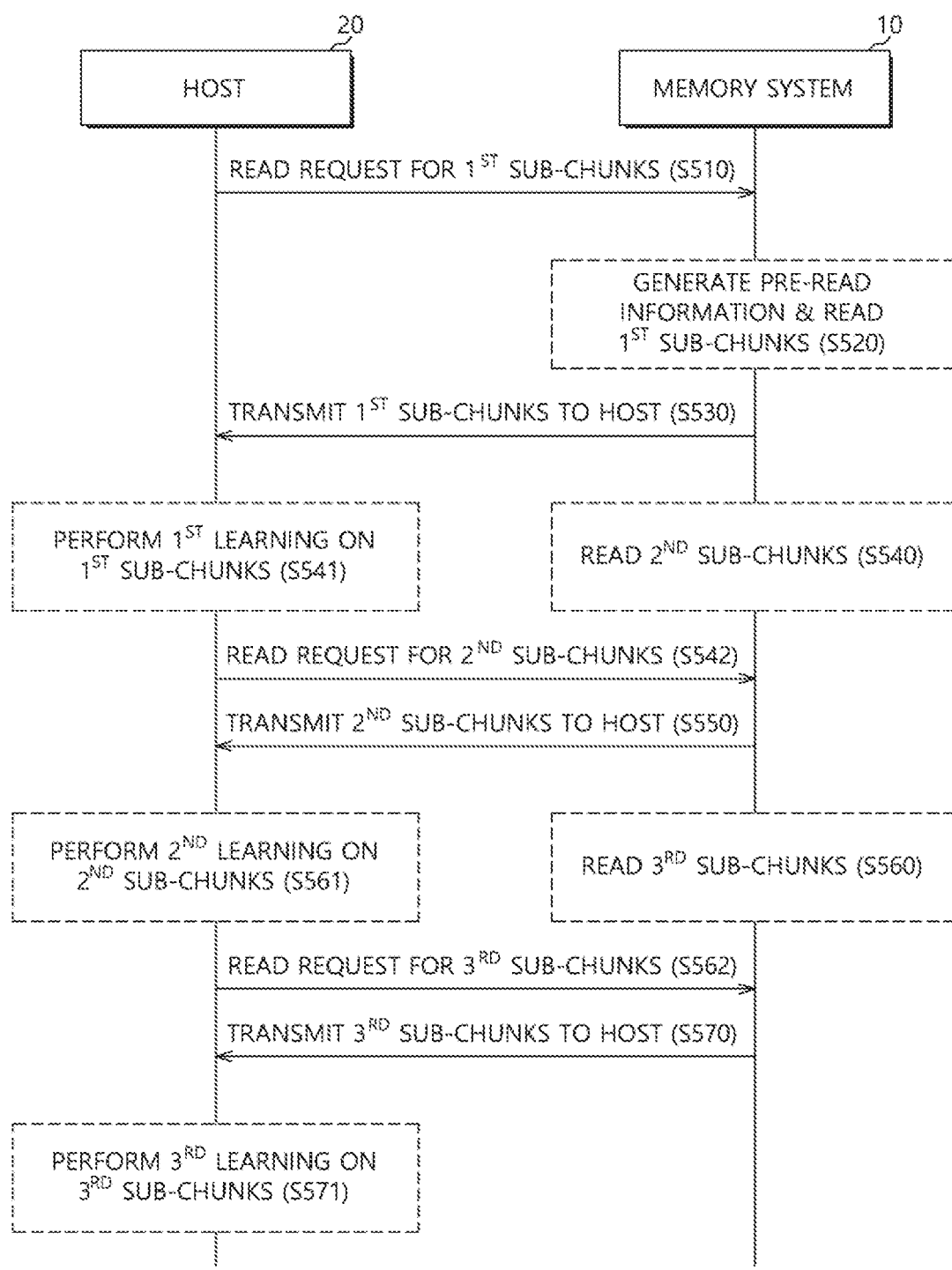
FIG. 5 is a transaction flowchart illustrating an operation of a memory system in accordance with an embodiment of the present disclosure.

FIG. 5 is a flowchart illustrating an operation of a memory system in accordance with an embodiment of the present disclosure.

Hereinafter, it is assumed that the machine learning data illustrated in FIG. 3(*a*) is stored in the memory system 10 such that it is possible for the host 20 to perform a machine learning operation according to the RNN scheme or the LSTM scheme as illustrated in FIG. 3(*b*).

Referring to FIG. 5, the memory system 10 in step S510 may receive a read request for $1^{st}$ sub-chunks within respective data chunks of the machine learning data from the host 20. The machine learning data may be stored in the memory system 10.

In an embodiment, the memory system 10 may determine whether the read request issued by the host 20 is for machine learning data. The read request for the $1^{st}$ sub-chunks, i.e., the machine learning data, may include information indicating that the read request is for the machine learning data used for a machine learning operation. When the read request includes the information indicating that the read request is for the machine learning data, the controller 200 may perform subsequent steps.

In step S520, the memory system 10 may read the machine learning data and may generate pre-read information. Upon determining that the read request is for the machine learning data, the controller 200 may read out the $1^{st}$ sub-chunks from the respective data chunks stored in the nonvolatile memory device 100 and may store the read $1^{st}$ sub-chunks into the memory 230.

The controller 200 may generate pre-read information based on a read pattern on the $1^{st}$ sub-chunks in the respective data chunks. The pre-read information may include a start address, a last address, a size, a batch size, and a batch length of the machine learning data.

In an embodiment, based on a start address and a data size of each of the $1^{st}$ sub-chunks, the controller 200 may obtain a number of the plurality of data chunks (i.e., the batch size) configuring the machine learning data, a start address and a size (i.e., the batch length) of each of the plurality of data chunks, and may obtain a number of sub-chunks configuring each of the plurality of data chunks, a start is address and a size of each of the sub-chunks, and may generate the pre-read information. For example, the read request for the $1^{st}$ sub-chunks within the respective data chunks of the machine learning data illustrated in FIG. 3(*a*) may include information of addresses of a $1^{st}$ sub-chunk within the first data chunk (data chunk 1), a $1^{st}$ sub-chunk within the second data chunk (data chunk 2), a $1^{st}$ sub-chunk within the third data chunk (data chunk 3) and a $1^{st}$ sub-chunk within the fourth data chunk (data chunk 4). Therefore, the controller 200 may determine, as the data size (i.e., the batch length) of the first data chunk (data chunk 1), the difference in the addresses between the $1^{st}$ sub-chunk within the first data chunk (data chunk 1) and the $1^{st}$ sub-chunk within the second data chunk (data chunk 2). Further, the controller 200 may determine, as the number of sub-chunks configuring the first data chunk (data chunk 1), a quotient of the data size of the first data chunk (data chunk 1) divided by a data size of the $1^{st}$ sub-chunk within the first data chunk (data chunk 1). Further, the controller 200 may determine the number of the first to fourth data chunks (i.e., the batch size) from the number of the $1^{st}$ sub-chunks, which are respectively included in the first to fourth data chunks.

In an embodiment, the controller 200 may store the generated pre-read information into the memory 230.

In step S530, the memory system 10 may provide the host 20 with the $1^{st}$ sub-chunks stored in the memory 230 of the controller 200.

In step S540, the memory system 10 may read out the $2^{nd}$ sub-chunks from the respective data chunks stored in the nonvolatile memory device 100. The controller 200 may read out, after completion of the transmission of the $1^{st}$ sub-chunks from the memory 230 to the host 20, the $2^{nd}$ sub-chunks from the plurality of data chunks based on the pre-read information and may store the read $2^{nd}$ sub-chunks into the memory 230. That is, the memory system 10 may perform a pre-read operation of reading in advance the $2^{nd}$ sub-chunks for the $2^{nd}$ unit learning operation of the host 20 and storing the read $2^{nd}$ sub-chunks into the memory 230. The memory system 10 may perform the pre-read operation for the $2^{nd}$ sub-chunks before receiving a read request for the $2^{nd}$ sub-chunks from the host 20.

In step S541, the host 20 may receive the $1^{st}$ sub-chunks provided from the memory system 10. The host 20 may perform the $1^{st}$ unit learning operation based on the received $1^{st}$ sub-chunks.

In step S542, the host 20 may provide, when the $1^{st}$ unit learning operation based on the $1^{st}$ sub-chunks is completed, the memory system 10 with a read request for the $2^{nd}$ sub-chunks for the $2^{nd}$ unit learning operation in order to receive the $2^{nd}$ sub-chunks from the memory system 10.

In step S550, the memory system 10 may provide the host 20 with the $2^{nd}$ sub-chunks stored in the memory 230 of the controller 200 in response to the read request for the $2^{nd}$ sub-chunks from the host 20. As such, while the host performs the $1^{st}$ unit learning operation based on the $1^{st}$ sub-chunks provided from the memory system 10, the memory system 10 may perform a pre-read operation is of reading out in advance the $2^{nd}$ sub-chunks from the nonvolatile memory device 100 and storing the read $2^{nd}$ sub-chunks into the memory 230 of the controller 200 to prepare for the read request for the $2^{nd}$ sub-chunks from the host 20. Thus, the memory system 10 may provide the $2^{nd}$ sub-chunks from the memory 230 of the controller 200 to the host 20 immediately upon receiving the read request for the $2^{nd}$ sub-chunks.

In step S560, the memory system 10 may read out the $3^{rd}$ sub-chunks from the respective data chunks stored in the nonvolatile memory device 100. The controller 200 may read out, after transmitting the $2^{nd}$ sub-chunks from the memory 230 to the host 20, the $3^{rd}$ sub-chunks within the plurality of data chunks based on the pre-read information and may store the read $3^{rd}$ sub-chunks into the memory 230. That is, the memory system 10 may perform a pre-read operation of reading in advance the $3^{rd}$ sub-chunks for the $3^{rd}$ unit learning operation of the host 20 and storing the read $3^{rd}$ sub-chunks into the memory 230 before receiving a read request for the $3^{rd}$ sub-chunks from the host 20.

In step S561, the host 20 may receive the $2^{nd}$ sub-chunks provided from the memory system 10. The host 20 may perform the $2^{nd}$ unit learning operation based on the received $2^{nd}$ sub-chunks.

In step S562, the host 20 may provide, when the $2^{nd}$ unit learning operation based on the $2^{nd}$ sub-chunks is completed, the memory system 10 with a read request for the $3^{rd}$ sub-chunks for the $3^{rd}$ unit learning operation in order to receive the $3^{rd}$ sub-chunks from the memory system 10.

In step S570, the memory system 10 may provide the host 20 with the $3^{rd}$ sub-chunks stored in the memory 230 of the controller 200 in response to receiving the read request for the $3^{rd}$ sub-chunks from the host 20. Since all the machine learning data is read out up to and including the last address, that is, the last sub-chunks within the respective data chunks configuring the machine learning data stored in the nonvolatile memory device 100, the memory system 10 may not perform additional pre-read operation.

In an embodiment, when a pre-read operation of reading $N^{th}$ sub-chunks, one of which corresponds to the last address of the machine learning data, is performed, the memory system 10 may not perform additional pre-read operation because the pre-read operation has been performed on all of the sub-chunks within the machine learning data.

In step S571, the host 20 may receive the 3rd sub-chunks provided from the memory system 10. The host 20 may perform the $3^{rd}$ unit learning operation based on the received $3^{rd}$ sub-chunks.

Figure 6:
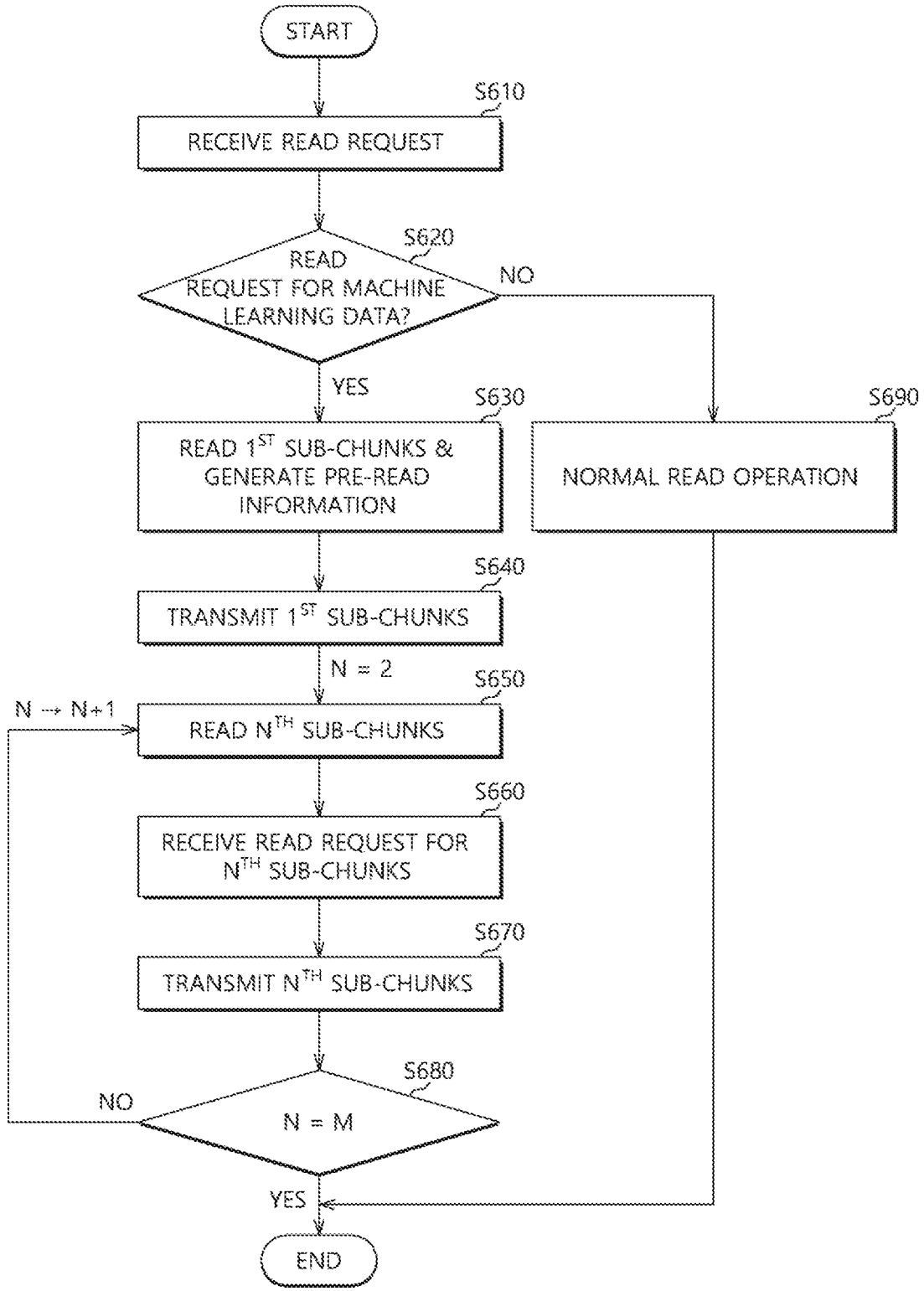
FIG. 6 is a flowchart illustrating an operation of a memory system in accordance with an embodiment of the present disclosure.

FIG. 6 is a flowchart illustrating an operation of a memory system in accordance with an embodiment of the present disclosure.

Referring to FIG. 6, the memory system 10 in step S610 may receive a read request from the host 20. The controller 200 may receive, from the host 20, a read request for data stored in the nonvolatile memory device 100.

In an embodiment, a read request may include an address of target data to be read. For example, when a read request is for $1^{st}$ sub-chunks from respective data chunks included in machine learning data, the read request may include an address of each of the $1^{st}$ sub-chunks.

In an embodiment, a read request may include information indicating that the target data thereof is to be used for a machine learning operation.

In step S620, the memory system 10 may determine whether the read request is for data to be used for a machine learning operation. The controller 200 may determine, when the read request includes such information, that the read request provided from the host 20 is for a machine learning operation. On the other hand, the controller 200 may determine, when the read request does not include such information, that the read request provided from the host 20 is not for a machine learning operation.

In step S630, the memory system 10 may read the $1^{st}$ sub-chunks and may generate pre-read information. Upon determining that the read request provided from the host 20 is for the machine learning data, the controller 200 may generate the pre-read information based on the read request for the $1^{st}$ sub-chunks.

In an embodiment, the controller 200 may generate, based on addresses included in the read request and respectively corresponding to the $1^{st}$ sub-chunks, the pre-read information including addresses respectively corresponding to $2^{nd}$ sub-chunks to last sub-chunks within the respective data chunks of the machine learning data.

Further, in response to the read request provided from the host 20, the controller 200 may read out the $1^{st}$ sub-chunks from the nonvolatile memory device 100 and store the read $1^{st}$ sub-chunks into the memory 230 of the controller 200.

In step S640, the memory system 10, and more specifically the controller 200, may provide the host 20 with the $1^{st}$ sub-chunks stored in the memory 230 of the controller 200.

In step S650, the memory system 10 may read out $N^{th}$ sub-chunks from the respective data chunks. Based on the pre-read information, the controller 200 may read out the $N^{th}$ sub-chunks from the nonvolatile memory device 100 and may store the read $N^{th}$ sub-chunks into the memory 230 of the controller 200.

In step S660, the memory system 10 may receive, from the host 20, a read request for the $N^{th}$ sub-chunks.

In step S670, the memory system 10, and more specifically the controller 200, may provide, in response to the read request for the $N^{th}$ sub-chunks, the host 20 with the $N^{th}$ sub-chunks stored in the memory 230 of the controller 200.

In step S680, the memory system 10 may determine whether a pre-read operation has been performed on the last sub-chunks within the machine learning data. When each of the plurality of data chunks comprises 'M' number of sub-chunks within the machine learning data, the controller 200 may determine whether $M^{th}$ sub-chunks have been provided to the host 20.

In an embodiment, the controller 200 may determine, when the $N^{th}$ sub-chunks are the last sub-chunks within the respective data chunks, that the $M^{th}$ sub-chunks have been provided to the host 20.

The controller 200 may perform, when the $N^{th}$ sub-chunks are not the last sub-chunks, i.e., the $M^{th}$ sub-chunks, the step S650 to perform a pre-read operation on $(N+1)^{th}$ sub-chunks.

In step S690, the memory system 10 may perform, when it is determined that the read request of step S610 is not for machine learning data, a normal read operation of reading out data, which corresponds to the read request, from the nonvolatile memory device 100 and providing the host 20 with the read data.

Figure 7:
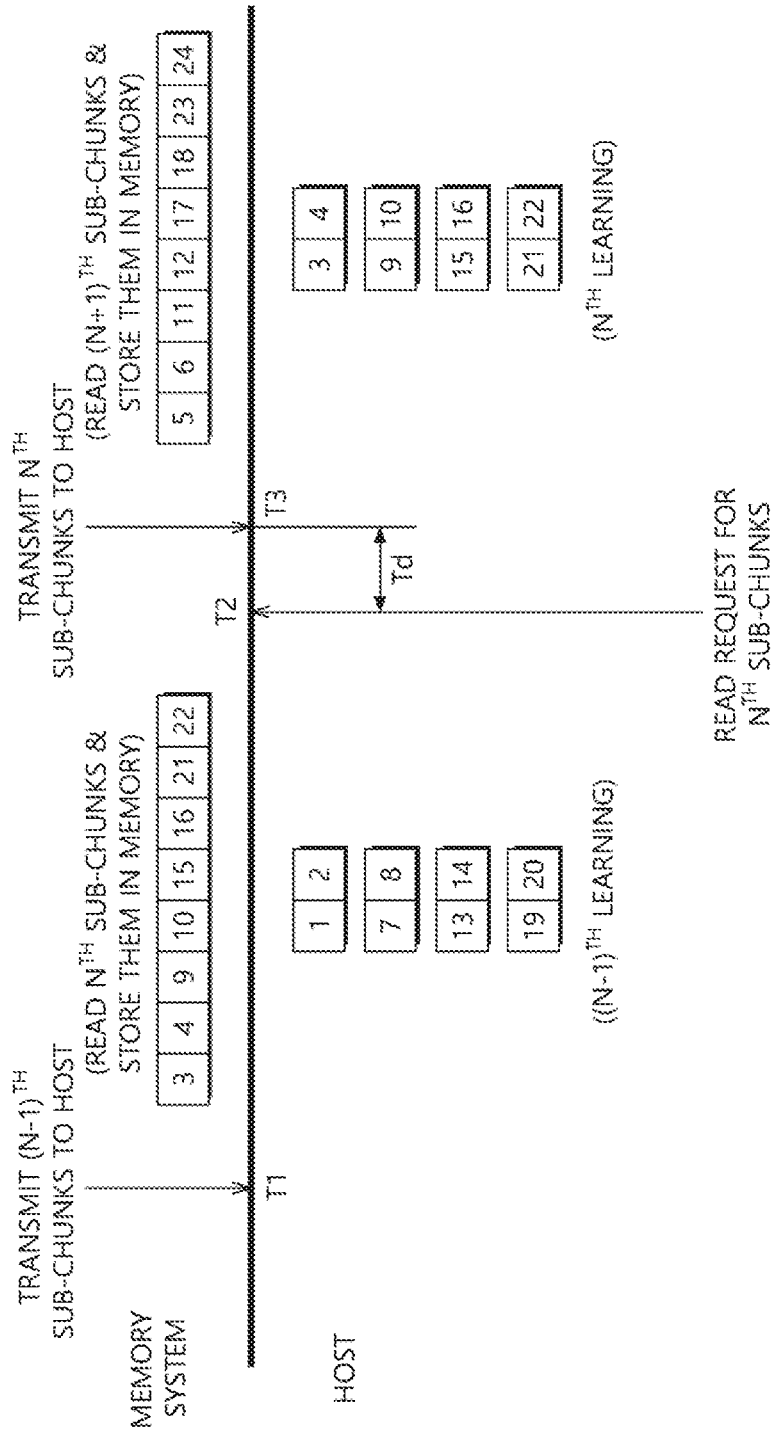
FIG. 7 is a schematic diagram illustrating a pre-read operation in accordance with an embodiment of the present disclosure.

FIG. 7 is a schematic diagram illustrating a pre-read operation in accordance with an embodiment of the present disclosure.

Referring to FIG. 7, the memory system 10 at time T1 may provide the host 20 with $(N-1)^{th}$ sub-chunks stored in the memory 230 of the controller 200. After providing the $(N-1)^{th}$ sub-chunks to the host 20, the memory system 10 may read out $N^{th}$ sub-chunks from the respective data chunks stored in the nonvolatile memory device 100 and may store the read $N^{th}$ sub-chunks into the memory 230 of the controller 200. The host 20 may perform a $(N-1)^{th}$ unit learning operation based on the $(N-1)^{th}$ sub-chunks provided from the memory system 10.

The host 20 at time T2 may provide the memory system 10 with a read request for the $N^{th}$ sub-chunks.

The memory system 10 at time T3 may provide the host 20 with the $N^{th}$ sub-chunks stored in the memory 230 of the controller 200.

After providing the $N^{th}$ sub-chunks to the host 20, the memory system 10 may read out $(N+1)^{th}$ sub-chunks from the respective data chunks stored in the nonvolatile memory device 100 and may store the read $(N+1)^{th}$ sub-chunks into the memory 230 of the controller 200.

The host 20 may perform a $N^{th}$ unit learning operation based on the $N^{th}$ sub-chunks provided from the memory system 10.

In accordance with an embodiment of the present disclosure, the memory system 10 may perform, before receiving a read request for $N^{th}$ sub-chunks from the host 20, a pre-read operation of reading out the $N^{th}$ sub-chunks from the nonvolatile memory device 100 and storing the read $N^{th}$ sub-chunks into the memory 230 of the controller. Therefore, it is possible to minimize a time delay Td required to provide the host 20 with the $N^{th}$ sub-chunks after receiving the read request for $N^{th}$ sub-chunks from the host 20.

Figure 8:
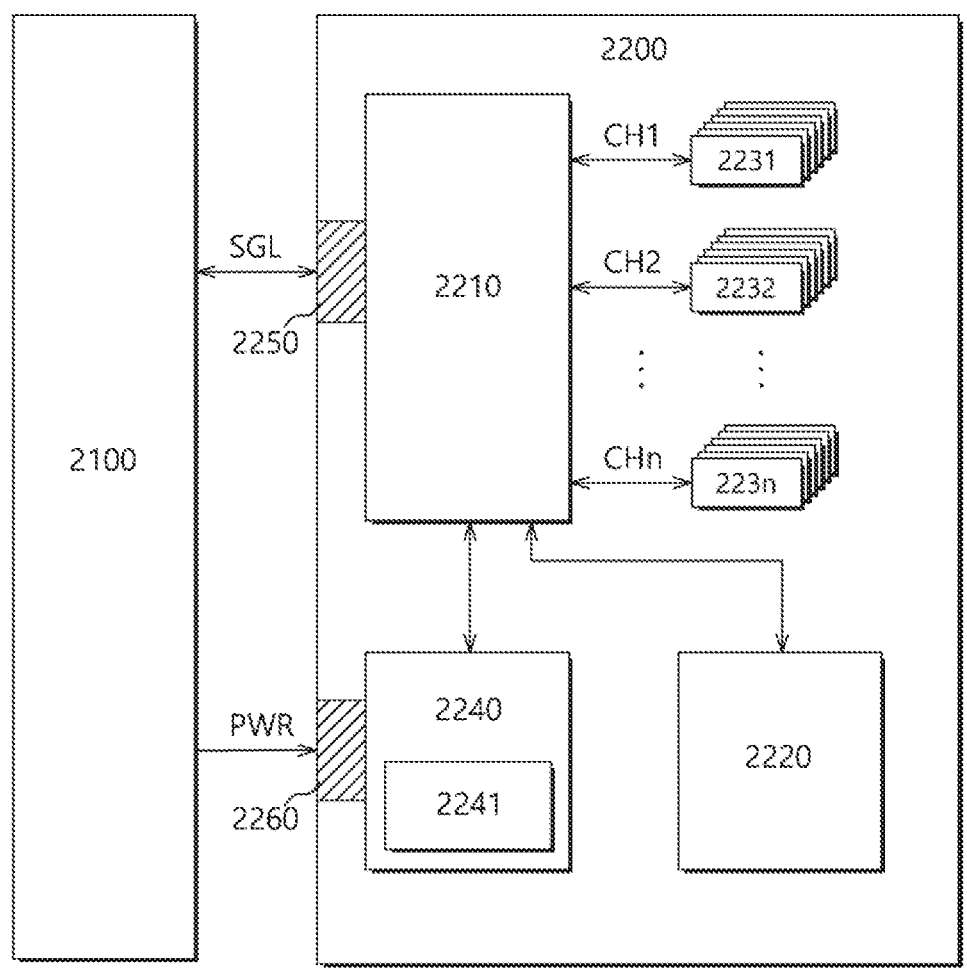
FIG. 8 is a diagram illustrating a solid state drive (SSD) in accordance with an embodiment of the present disclosure.

FIG. 8 is a diagram illustrating a configuration of a data processing system including a solid state drive (SSD) in accordance with an embodiment of the present disclosure. Referring to FIG. 8, a data processing system 2000 may include a host 2100 and a solid state drive (SSD) 2200.

The SSD 2200 may include a controller 2210, a buffer memory device 2220, nonvolatile memory devices 2231 to 223n, a power supply 2240, a signal connector 2250, and a power connector 2260.

The controller 2210 may control overall operation of the SSD 2200. The controller 2210 may be implemented and operate in substantially the same way as the controller 200 of FIG. 1.

The buffer memory device 2220 may temporarily store data to be stored in the nonvolatile memory devices 2231 to 223n. Further, the buffer memory device 2220 may temporarily store data read from the nonvolatile memory devices 2231 to 223n. The data temporarily stored in the buffer memory device 2220 may be transmitted to the host 2100 or the nonvolatile memory devices 2231 to 223n according to control of the controller 2210.

The nonvolatile memory devices 2231 to 223n may be used as storage media of the SSD 2200. The nonvolatile memory devices 2231 to 223n may be electrically coupled to the controller 2210 through a plurality of channels CH1 to CHn, respectively. One or more nonvolatile memory devices may be coupled to a single channel. The nonvolatile memory devices coupled to a single channel may be coupled to the same signal bus and data bus.

The power supply 2240 may provide power to the inside of the SSD 2200, with power PWR inputted through the power connector 2260. The power supply 2240 may include an auxiliary power supply 2241. The auxiliary power supply 2241 may supply power to allow the SSD 2200 to be properly terminated when sudden power-off (SPO) occurs.

The auxiliary power supply 2241 may include large capacity capacitors capable of charging the power PWR.

The controller 2210 may exchange a signal SGL with the host 2100 through the signal connector 2250. The signal SGL may include a command, an address, data, and the like. The signal connector 2250 may be configured as any of various types of connectors according to an interface scheme between the host 2100 and the SSD 2200.

Figure 9:
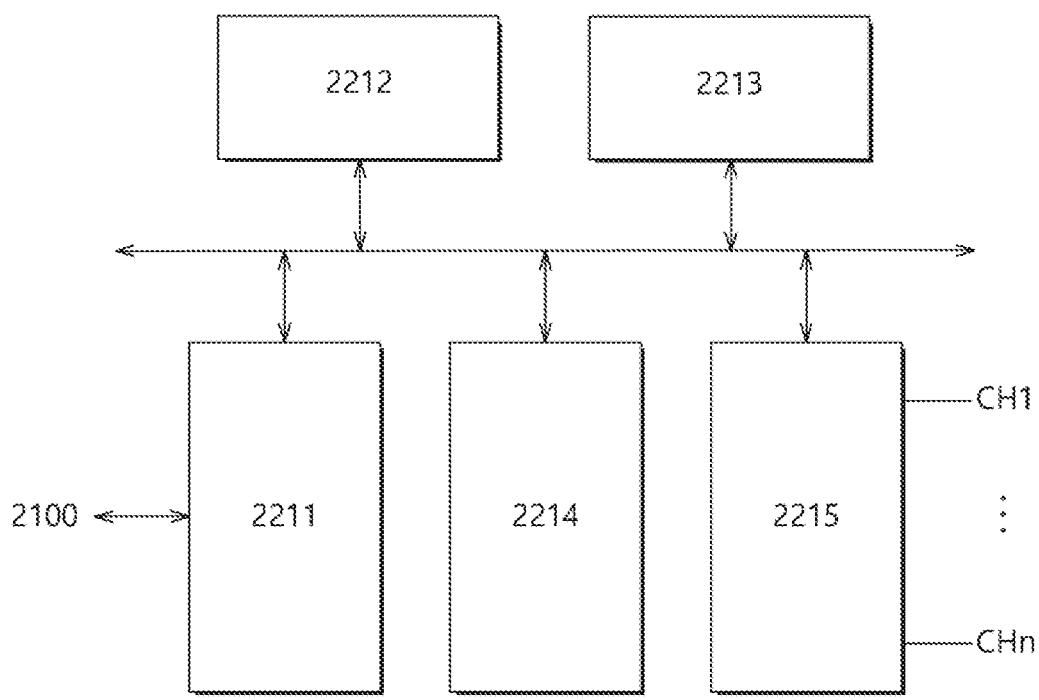
FIG. 9 is a diagram illustrating a configuration of a controller, such as that illustrated in FIG. 8.

FIG. 9 is a diagram illustrating a configuration of the controller illustrated in FIG. 8. Referring to FIG. 9, the controller 2210 may include a host interface 2211, a control component 2212, a random access memory 2213, an error correction code (ECC) component 2214, and a memory interface 2215.

The host interface 2211 may perform interfacing between the host 2100 and the SSD 2200 according to a protocol of the host 2100. For example, the host interface 2211 may communicate with the host 2100 through any of the following protocols: secure digital (SD), universal serial bus (USB), multi-media card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI Express (PCI-E), and/or universal flash storage (UFS). In addition, the host interface 2211 may perform a disk emulating function of supporting the host 2100 to recognize the SSD 2200 as a general-purpose memory system, for example, a hard disk drive (HDD).

The control component 2212 may parse and process the signal SGL provided from the host 2100. The control component 2212 may control operations of internal function blocks according to firmware or software for driving the SSD 2200. The random access memory 2213 may operate as a working memory for driving such firmware or software.

The ECC component 2214 may generate parity data for data to be transmitted to the nonvolatile memory devices 2231 to 223n. The generated parity data may be stored, along with the data, in the nonvolatile memory devices 2231 to 223n. The ECC component 2214 may detect errors of data read out from the nonvolatile memory devices 2231 to 223n based on the parity data. When the detected errors are within a correctable range, the ECC component 2214 may correct the detected errors.

The memory interface 2215 may provide control signals such as commands and addresses to the nonvolatile memory devices 2231 to 223n according to control of the control component 2212. The memory interface 2215 may exchange data with the nonvolatile memory devices 2231 to 223n according to control of the control component 2212. For example, the memory interface 2215 may provide data stored in the buffer memory device 2220 to the nonvolatile memory devices 2231 to 223n or provide data read from the nonvolatile memory devices 2231 to 223n to the buffer memory device 2220.

Figure 10:
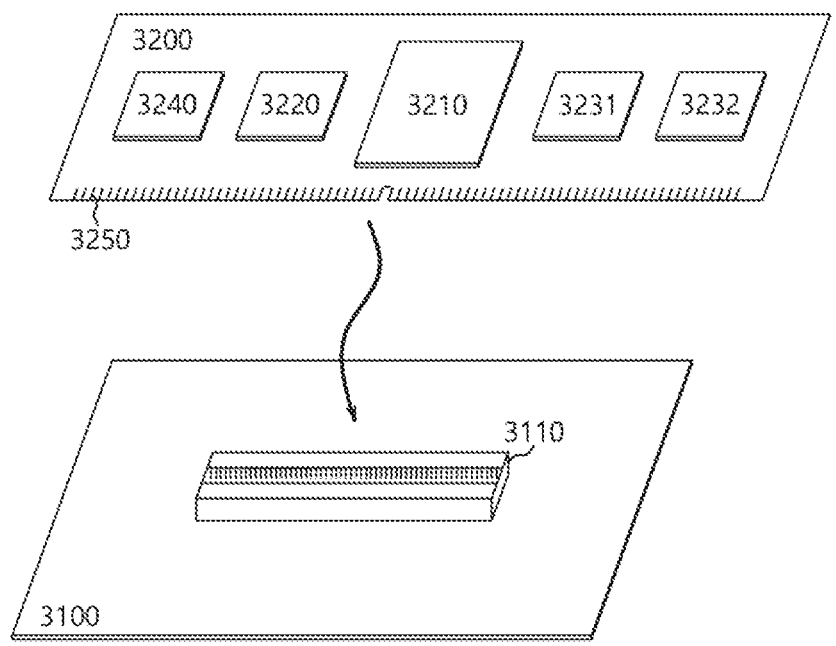
FIG. 10 is a diagram illustrating a configuration of a data processing system including a memory system in accordance with an embodiment of the present disclosure.

FIG. 10 is a diagram illustrating a configuration of a data processing system including a memory system in accordance with an embodiment of the present disclosure. Referring to FIG. 10, a data processing system 3000 may include a host 3100 and a memory system 3200.

The host 3100 may be configured in the form of a board such as a printed circuit board. Although not shown in FIG. 10, the host 3100 may include internal function blocks for performing functions of a host.

The host 3100 may include a connection terminal 3110 such as a socket, a slot, or a connector. The memory system 3200 may be mounted on the connection terminal 3110.

The memory system 3200 may be configured in the form of a board such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control overall operation of the memory system 3200. The controller 3210 may be configured in substantially the same manner as the controller 2210 shown in FIG. 9.

The buffer memory device 3220 may temporarily store data to be stored in the nonvolatile memory devices 3231 and 3232. Further, the buffer memory device 3220 may temporarily store data read out from the nonvolatile memory devices 3231 and 3232. The data temporarily stored in the buffer memory device 3220 may be transmitted to the host 3100 or the nonvolatile memory devices 3231 and 3232 according to control of the controller 3210.

The nonvolatile memory devices 3231 and 3232 may be used as storage media of the memory system 3200.

The PMIC 3240 may provide power to the inside of the memory system 3200, with power inputted through the connection terminal 3250. The PMIC 3240 may manage the power of the memory system 3200 according to control of the controller 3210.

The connection terminal 3250 may be electrically coupled to the connection terminal 3110 of the host 3100. Through the connection terminal 3250, signals such as commands, addresses, data and the like, and power may be transferred between the host 3100 and the memory system 3200. The connection terminal 3250 may be configured as any of various types depending on an interface scheme between the host 3100 and the memory system 3200. The connection terminal 3250 may be disposed on or in any side of the memory system 3200.

Figure 11:
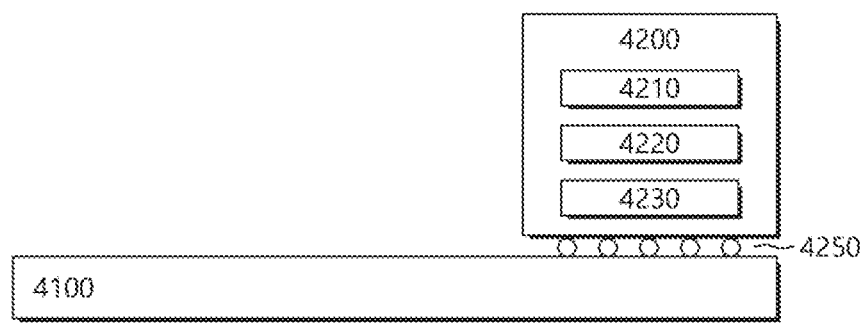
FIG. 11 is a diagram illustrating a configuration of a data processing system including a memory system in accordance with an embodiment of the present disclosure.

FIG. 11 is a diagram illustrating a configuration of a data processing system including a memory system in accordance with an embodiment of the present disclosure. Referring to FIG. 11, the data processing system 4000 may include a host 4100 and a memory system 4200.

The host 4100 may be configured in the form of a board such as a printed circuit board. Although not shown in FIG. 11, the host 4100 may include internal function blocks for performing functions of a host.

The memory system 4200 may be configured in the form of a package of a surface-mounting type. The memory system 4200 may be mounted on the host 4100 through solder balls 4250. The memory system 4200 may include a controller 4210, a buffer memory device 4220, and a nonvolatile memory device 4230.

The controller 4210 may control overall operation of the memory system 4200. The controller 4210 may be configured in substantially the same manner as the controller 2210 shown in FIG. 9.

The buffer memory device 4220 may temporarily store data to be stored in the nonvolatile memory device 4230. Further, the buffer memory device 4220 may temporarily store data read out from the nonvolatile memory device 4230. The data temporarily stored in the buffer memory device 4220 may be transmitted to the host 4100 or the nonvolatile memory device 4230 according to control of the controller 4210.

The nonvolatile memory device 4230 may be used as a storage medium of the memory system 4200.

Figure 12:
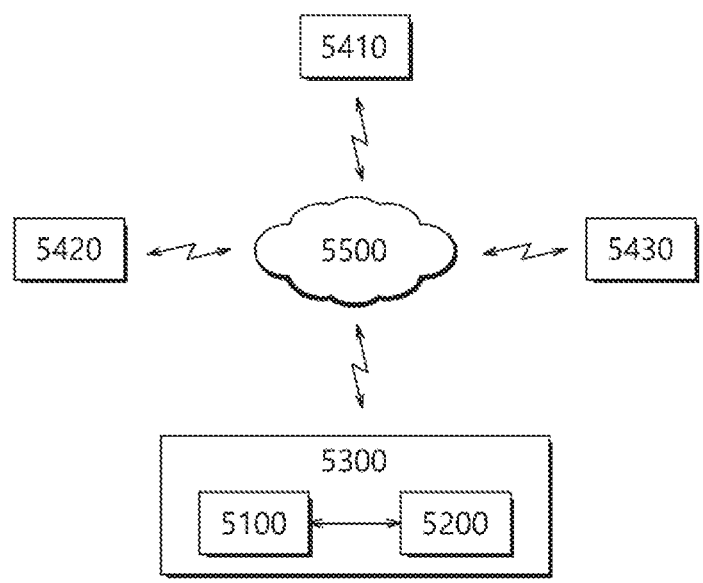
FIG. 12 is a diagram illustrating a configuration of a network system including a memory system in accordance with an embodiment of the present disclosure.

FIG. 12 is a diagram illustrating a configuration of a network system 5000 including a memory system in accordance with an embodiment of the present disclosure. Referring to FIG. 12, the network system 5000 may include a server system 5300 and a plurality of client systems 5410 to 5430 which are electrically coupled to each other through a network 5500.

The server system 5300 may service data in response to requests from the plurality of client systems 5410 to 5430. For is example, the server system 5300 may store data provided from the plurality of client systems 5410 to 5430. In another example, the server system 5300 may provide data to the plurality of client systems 5410 to 5430.

The server system 5300 may include a host 5100 and a memory system 5200. The memory system 5200 may be configured as the memory system 10 illustrated in FIG. 1, the memory system 2200 illustrated in FIG. 9, the memory system 3200 illustrated in FIG. 10, or the memory system 4200 illustrated in FIG. 11.

While certain embodiments have been illustrated and described, it will be understood to those skilled in the art that the disclosed embodiments represent examples only. Accordingly, the present invention is not limited to or by the disclosed embodiments. Rather, the present invention encompasses all modifications and variations of any of the disclosed embodiments that fall within the scope of the claims.

What is claimed is:

1. An operating method of a controller for controlling a nonvolatile memory device, the operating method comprising:

generating pre-read information based on a first read request, reading out $1^{st}$ sub-chunks respectively included in a plurality of data chunks from the nonvolatile memory device, and providing a host with the read $1^{st}$ sub-chunks, wherein the first read request includes respective addresses of the $1^{st}$ sub-chunks;

starting, after the $1^{st}$ sub-chunks are provided to the host, a pre-read operation of reading out $2^{nd}$ sub-chunks respectively included in the plurality of data chunks from the nonvolatile memory device based on the pre-read information and storing the read $2^{nd}$ sub-chunks into a memory in the controller; and providing, after the pre-read operation is started, the host with the $2^{nd}$ sub-chunks stored in the memory in response to a second read request received from the host, wherein the nonvolatile memory device stores machine learning data that includes the plurality of data chunks, and each of the plurality of data chunks includes a plurality of sub-chunks including the $1^{st}$ and $2^{nd}$ sub-chunks.

2. The operating method of claim 1, wherein the machine learning data is to be used for a machine learning operation based on Recurrent Neural Networks (RNN) or Long Short-Term Memory models (LSTM).

3. The operating method of claim 2, wherein the first read request includes information indicating that the first read request is for data to be used in the machine learning operation, and wherein the pre-read information is generated when the information indicating that the first read request is for data to be used in the machine learning operation is detected.

4. The operating method of claim 1, wherein the pre-read information includes respective addresses of the second sub-chunk to the last sub-chunk among the plurality of sub-chunks within each of the plurality of data chunks.

5. The operating method of claim 1, wherein the machine learning data is stored in the nonvolatile memory device through a sequential write operation.

6. The operating method of claim 1, wherein a number of the plurality of data chunks included in the machine learning data is a batch size.

7. The operating method of claim 1, wherein a size of each of the plurality of data chunks is a batch length.

8. The operating method of claim 1, wherein each of the plurality of sub-chunks is a unit of learning processed in a machine learning operation based on Recurrent Neural Networks (RNN) or Long Short-Term Memory models (LSTM).

9. A memory system including:
a nonvolatile memory device configured to store machine learning data; and
a controller configured to control the nonvolatile memory device,
wherein the machine learning data includes a plurality of data chunks, and each of the plurality of data chunks includes a plurality of sub-chunks, and
wherein the controller is further configured to:
generate pre-read information based on a first read request, read out $1^{st}$ sub-chunks respectively included in the plurality of data chunks from the nonvolatile memory device, and provide a host with the read $1^{st}$ sub-chunks, wherein the first read request includes respective addresses of the $1^{st}$ sub-chunks;
start, after the $1^{st}$ sub-chunks are provided to the host, a pre-read operation of reading out $2^{nd}$ sub-chunks respectively included in the plurality of data chunks from the nonvolatile memory device based on the pre-read information and store the read $2^{nd}$ sub-chunks into a memory in the controller; and
provide, after the pre-read operation is started, the host with the $2^{nd}$ sub-chunks stored in the memory in response to a second read request received from the host.

10. The memory system of claim 9, wherein the machine learning data is to be used for a machine learning operation based on Recurrent Neural Networks (RNN) or Long Short-Term Memory models (LSTM).

11. The memory system of claim 10,
wherein the first read request includes information indicating that the first read request is for data to be used in the machine learning operation, and
wherein the controller generates the pre-read information when the information indicating that the first read request is for data to be used in the machine learning operation is detected.

12. The memory system of claim 9, wherein the pre-read information includes respective addresses of the second sub-chunk to the last sub-chunk among the plurality of sub-chunks within each of the plurality of data chunks.

13. The memory system of claim 9, wherein the machine learning data is stored in the nonvolatile memory device through a sequential write operation.

14. The memory system of claim 9, wherein a number of the plurality of data chunks included in the machine learning data is a batch size.

15. The memory system of claim 9, wherein a size of each of the plurality of data chunks is a batch length.

16. The memory system of claim 9, wherein each of the plurality of sub-chunks is a unit of learning processed in a machine learning operation based on Recurrent Neural Networks (RNN) or Long Short-Term Memory models (LSTM).

* * * * *